United States Patent Office 3,193,389
Patented July 6, 1965

3,193,389
PRESERVING BAKED GOODS BY THE ADDITION OF AMYLOPECTIN TO FLOUR DOUGH PRIOR TO BAKING
Rudolf Dehne, Dr. Heinrich-Jasperstrasse 31, Bad Harzburg-Bundheim, Germany
No Drawing. Filed Nov. 5, 1962, Ser. No. 235,522
22 Claims. (Cl. 99—90)

The present invention relates to improvements in the preservation of bread, and more particularly to a process for the increased preservation of bread by the addition of amylopectin to the flour dough ingredients prior to baking.

It is known to add starch per se to the flour in the production of bread, such starch often being added, for example in the form of potato flour. However, bread made with flour to which starch has been added does not possess increased freshness qualities where the bread is stored for any significant length of time before being used.

Bread, including packaged bread, is normally sold as a fresh, baked product, and due to the peculiar characteristics of baked goods, such as bread, the flavor, texture, freshness, appearance, etc. thereof are easily detrimentally affected. Generally, after a few days of standing, baked bread is considered stale. Because of the critical characteristics of bread, the same cannot be subjected to hot temperature treatments, which may be used conventionally in the preservation of other foods. Since baked bread is synthesized, rather than obtained in natural form, as in the case with vegetables, fruits, meats, etc., baked bread possesses a relatively low moisture content as compared with such other foods. Significantly, this moisture content is extremely critical to baked bread, since the fresh taste and appearance of the bread will be detrimentally affected by a relatively narrow variation in the mosture content outside of the critical range thereof.

It will be appreciated that the marketability of baked bread will be destroyed not only by reason of the impairment of the fresh taste and appearance of the same, but also by reason of the presence of very resistant bacteria, such as the chalk mold which is often found in bread. With respect to the latter consideration, although various techniques have been used in the art to sterilize bread for packaging and storage over extended periods of time at normal temperatures, one or more inherent factors traceable to the baked bread itself have prevented a successful, simple, and economical packaging operation for bread.

It is an object of the present invention to overcome the foregoing drawbacks and to provide for the preservation of bread by the addition of a specific agent, and to provide a process for making bread which includes the addition of amylopectin to the ingredients prior to baking.

Other and further objects of the present invention will become apparent from a study of the within specification and accompanying examples.

It has been found, in accordance with the present invention, that the quality of the freshness of bread may be extraordinarily increased by the addition of amylopectin to the bread. It is surprising that in comparison with bread made with the addition of starch thereto, the addition of amylopectin prolongs the period at which the bread may be kept in fresh condition, especially if the bread is hermetically packed and sterilized. Such bread may be preserved up to periods of 9–12 months and longer at room temperature, without any loss of freshness and good taste. The amylopectin is added to the bread flour or dough in an amount of from 5–30% by weight based upon the flour content of the bread.

Broadly, the present invention contemplates a process for the increased preservation of bread and similar baked goods which comprises adding amylopectin to the flour dough ingredients to be baked, and then baking the ingredients in the usual manner. More specifically, the present invention relates to an improvement in the process for baking bread and the like, for the increased preservation of the freshness thereof, which comprises adding amylopectin to the flour dough ingredients to be baked, prior to baking, in an amount between about 5–30% by weight of the flour content of the dough, and preferably between about 5–10% thereof, and thereafter carrying out the baking in the normal manner. Preferably, the flour dough ingredients are white bread flour dough ingredients, whereby the baked bread will be white bread. Of course, other kinds of bread flour may be used with equally good results.

Upon baking the bread, the same may be enclosed thereafter in a plastic foil bag, having a sealable opening such as a polyolefin bag, i.e. polyethylene, polypropylene, etc. The bag is then substantially evacuated of air and the opening is sealed while so evacuated. The sealed package thereby formed may be effectively heat sterilized at a temperature of at least about 70 degrees C. for at least 15 minutes so as to produce a packaged bread which may be stored over extended periods of time without adversely affecting the freshness qualities of the bread. The temperature of the sterilization preferably employed may be between about 70–100° C. while the period of sterilization may be between about 15 minutes and 1 hour. The plastic material used, of course, must be of a kind which prevents the passage of bacteria, microorganisms, etc. therethrough, and which is not affected adversely by the sterilization temperatures employed.

Amylopectin represents the gel constituent of starch paste as opposed to amylose which is the sol constituent of starch paste. Amylopectin is known per se (see Angewandte Chemie, 1951, page 155). While larger amounts of amylopectin, up to about 30%, may be readily used in accordance with the invention, favorable results are indeed obtained with as little as 5–10% based upon the flour content of the bread.

Upon baking, the bread may be durably packaged for extended storage in a very specific manner, although this is not unconditionally necessary, as aforesaid, by packaging the bread in a polyolefin foil, preferably polyethylene or polypropylene, and then evacuating the foil bag by applying a vacuum to the bag opening or by pressing the foil bag directly against the bread to remove substantially all of the air present therein. The package, of course, is sealed with the bag contents under vacuum or low pressure conditions, such that heat sterilization at 70 degrees C. or higher, preferably at about 90–100 degrees C., for at least about 15 minutes and up to 1 hour, will produce packaged bread in sterilized condition capable of being stored over extended periods of time without impairment to the quality of the freshness of the bread.

It will be appreciated that the quantity of the remaining dough constituents, besides the amylopectin, will not be changed by reason of the addition of amylopectin. Thus, the preparation of the bread is effective in the conventional manner, for example by mixing 75 kilograms of flour, 50 kilograms of water, and 1 kilogram of yeast, together with the desired quantity of spices, such as 1 kilogram of salt, these ingredients thereafter being thoroughly kneaded into a dough, and thereafter such dough additionally treated with about 5 to 30% by weight of amylopectin based upon the flour quantity used. Naturally, the amylopectin must be thoroughly kneaded into the rest of the dough before the baking. Accordingly, it is best to add the required amylopectin quantity to the flour, and only thereafter combine the admixture of these two ingredients with the required amount of water and other dough-forming constituents. The improvement in accordance with the present invention is suitable for the production of all kinds of bread, including rye bread, whole-wheat bread, breads composed of mixtures of rye and wheat flour, such as pumpernickel bread, as well as white bread made from white flour.

In general, a bread made from rye flour may be considered as fresh for about four days, while a pure wheat bread, such as white bread, already loses its fresh taste on the second day, and may be considered after an additional two days only of an inferior quality approaching staleness. Significantly, if about 30% amylopectin, based upon the flour content, is added to these bread quantities, prior to baking, the bread will remain fresh for about 3–4 times the ordinary period of freshness of the same bread not containing the additive of the invention. Specifically, amylopectin-containing rye bread will remain fresh for about 12–15 days, while amylopectin-containing wheat bread will remain fresh for about 7–9 days. It should be noted particularly that this extension of the duration of freshness of the bread is recognizable with respect to the taste thereof, and this is true with respect to breads which are stored in unpacked or unpackaged condition without any special precaution. Even where the so-called coarse meal or coarse floured bread is concerned, which is, as known, capable of remaining fresh even without special precautions for about 10 days, by the addition of amylopectin in accordance with the invention, an extension of the time at which the bread remains fresh by at least three-fold and even more will be attained.

It will be appreciated that the foregoing effects will be obtained irrespective of whether the amylopectin-containing dough is sour dough or yeast dough. Where the amylopectin-containing bread is sterilized in a hermetically sealed package in accordance with the invention, a substantially intensified effect with respect to the prolongation of the freshness of the bread is attained for periods of 9–12 months and longer in storage under ordinary conditions and without refrigeration. Thus, the stability of the bread toward aging is enhanced by the inclusion of amylopectin in the dough ingredients prior to baking.

Amylopectin-containing bread which is packaged and sterilized in accordance with the preferred embodiment of the invention is recommended in all cases where the bread, even sliced bread, is to be stored for more than a week, and/or is to be shipped over long distances or used in particular for camping purposes where refrigeration is inconvenient or not possible, and especially in times of war where the storage of bread over long periods of time without special care or the use thereof by soldiers in the field is of great importance. By reason of the packing of the bread in a polyolefin foil with subsequent evacuation of the foil, sealing thereof and sterilization of the sealed package, it is possible to store the bread containing amylopectin for 9–12 months without the same losing any of its palatability. Instead, such bread is still fresh even after the extended period of storage. While various procedures may be known for storing bread packaged in a polyolefin foil, under vacuum conditions and sterilized, in accordance with the present invention, by the addition of amylopectin to the bread ingredients, a prolongation of the storage time of such bread in packaged, sterilized condition is possible beyond 9 months. The minimum care required for storing bread prepared in accordance with the present invention is particularly important where it is desired to store such bread for use during emergencies, i.e. where large quantities of bread may be required in cases of catastrophe, which bread can be kept on hand without the need for special storage facilities, such as refrigeration, which may not be available during such emergencies. Generally, polyolefin packing foils are particularly suitable in this respect, such as those sold under the name "Suprathen" by the firm of Kalle & Co., Germany. This foil is desirably somewhat larger than the bread itself, so that the bread may be readily inserted into the foil and upon evacuating the interior of the foil and sealing the opening, the foil will abut against the bread. Vacuums may be used within a wide range between about 0.3 and 0.8 atmosphere absolute and even lower. In general, however, pressures of about 300 mm. mercury are preferred.

In accordance with a modified embodiment of the present invention, a simple, economical, and efficient process for packaging the freshly baked bread prepared from flour containing amylopectin may be provided so that the packaged bread may be stored advantageously for periods of over 9 months and longer. Thus, amylopectin is added to the flour dough ingredients to be baked, preferably to the bread flour prior to the addition of the water content, and thereafter the ingredients are kneaded, placed in a bread mold, and baked, preferably at about 100 degrees C. for a period of about 18 to 30 hours. It will be noted that the baking period and the baking temperature of that example are illustrative only, but not limitative. These conditions may be varied, as for example, the baking treatment may be performed in ovens of other types, such as gas heated ovens, or using other types of flour or other ingredients. This will be the case if it is desired to prepare rye-wholemeal bread instead of pumpernickel. The freshly baked bread, upon removal from the oven is immediately thereafter aged by allowing the mass to stand for a period of at least about 6 hours immediately after baking to cool and to structurally stabilize or solidify the comparatively hot, soft mass. An aging period of more than 15 to 20 hours is without any essential effect on the bread, but is undesirable from an economical point of view. The bread is next moistened just on the surface of the mass to soften slightly the outermost crispy surface portion thereof without softening the interior portion of the mass. Then, the mass is hermetically sealed in a flexible, heat-sealable polyolefin foil under a vacuum of at least about 0.8 atmosphere absolute, and the hermetically sealed mass in the foil is sterilized at a temperature between about 70 and 120 degrees C. for a period of about 0.5 and 3 hours, and preferably from 0.5 to 2.5 hours, sufficient to effect sterilization of the bread. If desired, in order to ensure storage for periods of 9–12 months and longer, without refrigeration, so as to retain the favorable qualities of freshness and taste, the bread, immediately after the sterilization step may be cool rapidly to at least about 10 degrees C. in the sterilized hermetically sealed package.

In accordance with a preferred embodiment of the invention, the baked bread mass may be in the form of sliced bread, such as rye bread, or pumpernickel bread, and the foil used may be of such dimensions that the expanded volume of the foil containing the bread is between about 25–50% greater than the corresponding volume of the bread itself. The aging may be effected for a period between about 6–20 hours, depending upon the type of baked bread being treated, and the moistening may be effected for a period between about 1–3 hours to take up between about 0.5 and 5% moisture (reckoned on the moisture content of the whole bread) in the bread surface. The hermetic sealing may be effected under a vacuum between about 0.3 and 0.8 atmosphere absolute, which generally corresponds with the preferred range of 400–200 mm. mercury pressure, in a transparent, flexible foil essentially free from softeners and plasticizers and having a thickness between about 0.03 and 0.1 mm. and, if desired, an area of about 1 to 1.2 times the outer surface area of the baked bread mass. The sterilizing may be effected at about 90–100 degrees C. to achieve a sterilizing temperature of 70–87 degrees C., and preferably 77–87 degrees C., in the interior of the bread mass, and the subsequent cooling, if employed may be between 10 and 0 degrees C. It is desirable to use an amount of foil which is somewhat more than is necessary to completely cover the mass of baked bread therewithin. The foil to be used is preferably a polyolefin foil, such as polyethylene or polypropylene, the same being of a thickness less than 0.15 mm., i.e. 0.03 to 0.1 mm., and thus slightly permeable to oxygen yet simultaneously impermeable to the passage of bacteria therethrough. Hence, upon standing oxygen may breathe through the foil and thus maintain the packaged and sterilized baked bread fresh. While various synthetic foils are known, which are resistant to the passage of gases and liquids, it has been found, in accordance with the present invention, that within the critical thickness below 0.15 mm. noted above, the polyolefin foil, and especially polyethylene foil, permits the desired permeation therethrough of oxygen.

A foil thickness of more than about 0.1 mm. leads to rapid aging of the bread and also of the foil with the result that the danger of breakage or rupture of the foil is increased. A foil thickness of less than about 0.03 mm. is undesirable since the danger of injury to the foil is also increased because of the inherent mechanical weakness of such a thin foil.

The polyolefin foil material, significantly, should be essentially free from softeners or plasticizers, since the presence of these ingredients in the foil may detrimentally affect the baked bread upon standing. Specifically, bread during storage in the foil may take up these ingredients whereby the taste, freshness, etc. of the packaged product will be adversely affected. Moreover, the foregoing foil must be resistant to heat deformation at sterilizing temperatures up to about 120 degrees C. and especially 105–110 degrees C.

The moistening step of the surface of the mass of baked bread may be carried out by wrapping the mass in moist wrappings, such as a moist cloth, the moistening being carried out for a period of from 1 to 3 hours, but preferably about 1 hour. On the other hand, the moistening of the surface of the mass may carried out by subjecting the mass to contact with steam for the same period of time, though preferably between about 1–2 hours. The steam treatment may be effected conveniently in a closed zone, additionally containing water vapor.

The sterilization may be practiced at a temperature of about 70 to 90 degrees C. in accordance with one preferred feature of the invention, using hot air saturated with steam, or, alternatively, a water bath in which the packaged bread is immersed, for this purpose. During the sterilization, the mass may be situated on a support having a low coefficient of heat conduction or heat radiation, each foil package being separated from adjacent foil packages so that uniform heat distribution will be possible during the sterilization. Upon the termination of the sterilization of the foil-packaged baked bread mass, the bread may be recovered and stored at room temperature for periods of over 6 months without any significant loss of the flavor, taste, freshness, etc. of the bread. Of course, it is especially advantageous to rapidly cool the foil-package bread immediately after sterilization and while still hot to a temperature below room temperature, i.e. between about 10–0 degrees C. within about ½ hour, in order to enhance the durability qualities of the mass being stored. This step serves to increase the effect of the sterilization as it has been found that if the rapid cooling step is omitted, a regeneration of microorganisms may occur during storage of the bread at room temperature to a slight extent.

In accordance with a specific embodiment of the invention, therefore, a process for packaging freshly baked amylopectin-containing bread is contemplated in which the bread mass is cooled and aged by allowing the bread to stand for a period of from 6–20 hours immediately after baking, then moistened to the extent of increasing by 0.5 to 5% the moisture (reckoned on the moisture content of the whole bread) content along the surface to soften slightly the outer crispy crust of the bread mass without softening the interior thereof, and then hermetically sealed in a flexible, heat-sealable polyolefin foil, essentially free from plasticizers, and softeners, and having an inside volume between about 25–50% greater than the volume of the bread mass, under a vacuum of between about 0.3 and 0.8 atmosphere absolute so that the foil is maintained in surface contact with the bread mass. The sterilization is carried out preferably between about 90–100 degrees C. for a period of about 1 to 2.5 hours sufficient to effect sterilization of the bread, and optionally, the hot-packaged bread is finally rapidly cooled to between about 10 and 0 degrees C., and thereafter recovered and stored at room temperature.

More particularly, where the bread is sliced bread, as for example prior to the sealing in the foil, or prior to the moistening step, the bread mass disposed in sealed condition within the polyolefin foil, such as a polyethylene foil having a thickness between about 0.03 and 0.1 mm., may be discretely placed upon a support surface of aluminum or ceramic material so that the cut slices are maintained in a substantially horizontal plane, the sterilization being effected conveniently at a temperature of about 70 to 90 degrees C. The resulting foil-packaged bread mass then may be rapidly cooled to a temperature between about 10 and 0 degrees C. for improving the durability of the bread in storage and for specifically avoiding the regeneration of any microorganism therein.

With respect to the first after-treatment step for packaging the amylopectin-containing bread in accordance with the present invention, the baked bread, upon being removed from the baking oven at about 100 degrees C., must be stored for a period of time sufficient to allow the pore-framework of the initially soft, hot, baked mass, to stabilize and solidify. Even though the baked bread has become sufficiently cooled, the same must still be stored for an additional period of time in order to effect a certain degree of internal drying and solidifying of the moist baked mass. Thereafter, the bread may be moistened on its surface and then inserted into the polyolefin foil so that the subsequent steps may be carried out. The storage or waiting time between the removal of the baked bread from the oven and the filling of such bread into the foil, of course, depends somewhat upon the type of bread in question. Above all, this waiting time or aging period depends upon the type of flour used in the bread and also whether a crust-free mass or a bread mass with a pronounced crust is being baked and packaged. Generally, the waiting time or aging period amounts to between about 6–20 hours, such waiting time being within the upper part of the range as more rye flour is contained in the bread, for example. In this connection, where pure rye bread is being baked, the optimum waiting time is about 10–14 hours but may be extended in any particular case to about 20 hours if desired. In a mixed bread, for example, one containing rye flour and wheat flour in admixture, in a ratio of 1:1, the waiting time amounts to about 6–8 hours. On the other hand, where pure wheat bread is baked, for example, white bread, it is not usually necessary to age the bread longer than about 6 hours, Nevertheless, it will be appreciated that very much shorter periods of time, for example, below 5 hours, are undesirable.

Once the bread has been correctly cooled and aged, the same is now solid enough for slicing and if the bread is to be sliced, this operation may take place at this point.

Where cooled and aged bread is concerned, a further difficulty is present insofar as the bread possesses hard, projecting portions in the bread crust, which, under the usual conditions, lead frequently to the injury of the foil in contact therewith. This drawback may be readily overcome in accordance with the invention, by subjecting the bread, even after the same has been sliced, to the second after-treatment step moisture treatment indicated above, i.e. wrapping the bread in a moist cloth or steaming the bread, for a period of 1–3 hours, but at least 1 hour. The steam treatment preferably takes place in a particular type of conditioning chamber having an atmosphere enriched with water vapor. On the other hand, the moisture treatment may be carried out as aforesaid by the application of moist cloth to the bread. The moistening treatment may be performed on the bread as a whole or on the bread cut into slices. In either instance, the bread crust must be sufficiently softened along the outermost portion thereof, so that the projecting points thereof are unable to exert any tearing or puncturing action on the foil during the insertion of the bread into the foil. At the same time, the bread, as a whole, must be sufficiently hard and solid; therefore, this moisture treatment is contemplated only for softening the hard projection points in the crust of the baked goods by the absorption of from 0.5 to 5% moisture (reckoned on the moisture content of the whole bread) in the surface portion only without adversely affecting the original condition of the interior of the bread itself. Hence, if the moistening step takes place after the bread has been sliced, the slices must be kept in tight abutment, to prevent moisture, meant only for the bread's outer surface, from coming into contact with the bread's interior, i.e. across the flat portions of the bread slices.

Once the baked goods have been properly aged and moisture treated, the baked bread mass in integral form or in sliced form is introduced during the third after-treatment step into the polyolefin foil packaging material. As aforesaid, care must be taken that the foil portion used is somewhat larger than is necessary for just covering the bread completely. It is sufficient if the excess volume of the polyolefin foil amounts to about 25–50% of the volume of the baked bread, i.e. the foil volume being 125–150% of the volume of the bread, referred to the expanded or hollow condition of the foil. One reason for requiring a slightly larger foil volume is to allow room for expansion for vapors which may possibly develop during extended storage of the baked goods. Once the baked bread has been packed into the foil, the interior of the foil is subjected to a partial vacuum in order to decrease the pressure and allow the foil to come into close contact with the surface of the bread. This may take place, for example, by placing one end of the foil between the jaws of a welding or heat-sealing apparatus with the open end of the foil being placed upon a small opening through which an evacuation tube is introduced. Upon permitting the suction of air from within the foil to take place by the vacuum created through the evacuation tube, the foil is pressed by the surrounding atmosphere into close contact with the baked mass. Generally, it is sufficient for the air pressure within the interior of the foil to be reduced to about 0.8 atmosphere absolute, and while a more extensive reduction in the pressure may be desired under some circumstances, in most cases, it is not necessary to go below 0.5 atmosphere absolute.

In this connection, going much below 0.3 atmosphere is undesirable since the bread may give off too many vapors and gases under such high vacuum, and this will adversely influence the sensitive qualities of the bread. On the other hand, exceeding 0.8 atmosphere absolute, is also undesirable since higher internal pressures will be generated in the sealed foil during the sterilization which might lead to the danger of bursting the foil.

In accordance with another feature of the invention, the main portion of the air may be removed from the foil containing the baked mass by the attachment of a pair of pressure plates on parallel sides of the mass, outside of the foil. Upon slightly pressing these plates together, the bread mass is also pressed within the foil interior so as to decrease the volume of the package in question. This is especially suitable where sliced bread is concerned, since the plates serve to maintain the slices in compact condition, i.e. even to the extent of reducing the foil volume to ½ of the original volume due to the squeezing out of air from the foil interior. While still in compacted condition, the open end of the foil must be sealed, preferably as close to the adjacent bread as possible for maintaining the reduced volume condition of the package, and the plates removed only thereafter.

Thus, in the case where a partial vacuum has been obtained within the foil by subjecting the foil to an evacuation treatment, as well as in the case where the foil and bread have been pressed together by pressing plates to reduce the content of air within the foil, the sealing of the foil takes place immediately thereafter by welding or bonding the open end. This may be carried out effectively by placing the open end between the jaws of a heat-sealing apparatus to which heat is applied electrically or in some other way, as for example, to achieve a bonding temperature of about 120 degrees C. The supplied heat serves to adequately bond the foil surfaces at the open end portion in the desired manner. It will be appreciated in this regard that the welding or bonding step must be such that an intimate, absolutely tight connection is obtained, since otherwise the seam will leak during the subsequent sterilization step. Accordingly, the welding or bonding jaws must be sufficiently hot, e.g. 120 degrees C. to achieve the desired fusion of the foil surfaces being bonded together and the jaw pressure must be maintained until the bonded seam has cooled.

In accordance with a specific embodiment of the invention, a current surge for a period of less than a second will suffice for achieving the desired fusion and heat sealing of the foil while the cooling should be carried out for about 10–20 seconds under the pressure of the bonding jaws before the sealed portion of the foil is removed from pressure contact therewith.

Therefore, in order to effect the hermetic sealing, the flexible polyolefin foil must be air-and-moisture-tight. Polyethylene has proven particularly suitable for this purpose as the same way be very easily hermetically sealed, as for example by heat-sealing techniques. The polyethylene foils used as aforesaid should have a thickness of about 0.03 to 0.1 mm. and even an area which is at least about 1 to 1.2 times greater than the outer surface area of the mound of baked goods to be packaged, as for example, the pile of sliced bread. Assuming the polyolefin foil has only one open end, the sealing under vacuum of such end may be effected by placing the bread in the polyolefin bag, withdrawing the air from such open end, and effecting the sealing in the foregoing manner. Where a tubular foil is being used, of course, first one end must be sealed before the air may be withdrawn from within the foil so that the other end may be effectively sealed to produce the desired packaging. By withdrawing sufficient air so that the remaining pressure in the hermetically sealed wrapping is about ½ an atmosphere absolute, and then sealing, an optimum packaging is achieved such that the subsequent sterilization may be efficiently carried out.

The evacuation step may be performed by suctioning out the air from the opening of the polyolefin foil containing the bread to be sterilized. In another embodiment of the invention the polyolefin foil containing the bread mass may be placed in an evacuation chamber, following closing the chamber, evacuating the closed chamber, sealing the polyolefin foil within the closed and evacuated chamber and reopening the said chamber after sealing the foil and after an appropriate cooling.

It will be appreciated that baked bread, packaged in the foregoing manner, may be sterilized by conventional methods without detriment to the packaging, since equilibrium between the air pressure in the wrapping and the atmospheric pressure is produced during the heat sterilization. Therefore, the wrapping is not subjected to any greater stresses than it is in the normal outside air. This feature prevents cracks in the wrapping, any rupturing, or a subsequent opening of the wrapping which might otherwise take place in order to relieve the excess pressure. Hence, a completely dependable sterilization is produced with the packaged product in accordance with the invention, such sterilization lasting for months, as evidenced by the durable condition of the packaged product after prolonged storage, without refrigeration and under normal conditions.

The sterilization in accordance with the fourth after-treatment step must be effected, of course, at a temperature below the melting and decomposition temperature of the polyolefin material of which the foil is composed, and/or below the temperature at which deterioration of the polyolefin material occurs. Thus, the sterilization temperature depends upon the softening temperature of the foil used. Where conventional polyethylene is concerned, having a melting point somewhat above 100 degrees C., temperatures of sterilization below this temperature are preferred. Generally, the sealed foil packages containing the bread are exposed for a prolonged period of time of from 1–3 hours, and preferably from 1 to 1.5 hours, to an increased temperature of at least above 70 degrees C., and preferably between about 90–100 degrees C. Temperatures above 100 degrees C. are not normally to be considered since they place too great a stress on the foil under the temperature and pressure conditions during the sterilization, unless the foil is resistant to heat deformation at temperatures above 100 degrees C., i.e. 120 degrees C.

It will be appreciated that the sterilization after-treatment step in accordance with the invention differs fundamentally from the sterilization of bread as previously carried out, for example, where the bread was packed in aluminum foil. In that case, the bread packages were disposed compactly one against the other, and thence exposed to relatively high temperatures. While this expedient was successful in the case of bread packaged in aluminum foil, it is not possible to subject bread packages tightly sealed in plastic foil to such high temperatures without impairing the integrity of the foil in question. Furthermore, it is necessary that the heat be supplied to the individual bread packages within the foil on all sides, such that the core or center of the bread will become heated at least for a period of 1 hour at 70 degrees C., and where it is desired to neutralize or destroy chalk mold, the center of the bread should be heated for a period of at least 1 hour to at least 77–81 degrees C. At these conditions the outer sterilization temperature must be more than 80° C. Temperatures lower than 80° C. are admissible if it is not desired to destroy any chalk mold. In order to attain the favored exposure of all sides of the packaging to the sterilization heat in an even manner, of course, the packages must be spaced at intervals from one another during the sterilization treatment, i.e. where a plurality of packaged products are being sterilized simultaneously.

With specific reference to fresh bread, and particularly pumpernickel, sterilization at a temperature of about 90 degrees C. in hot air completely saturated with steam for a period of about 1.5–3 hours has proven particularly satisfactory. The material being sterilized should be maintained at a temperature of at least 77–81 degrees C., as aforesaid, throughout its entire mass during this period of time. Such result is attained by using the hot air at a temperature of 90 degrees C. whereby the difficultly destroyable chalk mold bacteria are effectively destroyed within an hour or an hour and a half. Alternatively, the bread may be subjected to sterilization in a water bath having a temperature of about 90 degrees C. as well. For this treatment, a sterilization period of about 2¼ hours is certainly sufficient for destroying the chalk mold bacteria where as the other mold bacteria are destroyed within about an hour or an houlr and a half. The sterilization in accordance with the hot bath embodiment has the further advantage that a certain back pressure is exerted on the surface of the packaging by the water so that any possible leak tendency in the vacuum of the foil of the individual packages is compensated for since the foil is protected from undue stresses.

The foregoing temperatures have been found to be well tolerated by the foils used and to permit a sufficient sterilization to be carried out within a relatively short period of time, whereby packaged baked goods, such as bread, may be stored for an extended period of 9 months and even longer under normal room conditions.

Where packaged sliced bread is concerned, the bread mass should be sterilized preferably with the cut surfaces positioned as horizontally as possible so that the individual slices of the package do not tend to fan out or spread apart and thereby subject the wrapping to additional stresses. Furthermore, if the sterilization is effected in the saturated steam-hot air operation rather than in a water bath operation, it is preferred to place the package on a support having a poor coefficient of heat conductivity or heat radiation. Polyethylene foils tend to stick to other supports and are otherwise easily injured upon removal after the sterilization step. The tendency of the foil sheets towards sticking to the supports decreases correspondingly with a decrease in the coefficient of heat conductivity or heat radiation of the support in question. For this reason, enameled steel plates, and the like may be conveniently used. Suitable materials having a low coefficient of heat conductivity include ceramic materials, such as china, porcelain, marble, alumina, magnesia, etc. and any of these may be used as the support having a low coefficient of heat conductivity. In the same way, a support of aluminum may be used as one having a low coefficient of heat radiation. The packages of sliced bread, as noted above, should have their cut surfaces arranged horizontally on horizontal supports of the foregoing materials, the positioning being such that the individual packages are discretely spaced from one another to permit exposure of all sides of the package to the sterilization heat.

The bread, after the sterilization step, should be rapidly cooled in an optional fifth after-treatment step as aforesaid, from the sterilization temperature to a temperature of 10 degrees C., and preferably between 10 and 0 degrees C. within ½ hour. After such cooling step, once the package reaches room temperature again, the internal pressure in the package decreases to the initial vacuum pressure under which the hermetic sealing was effected, and the correspondingly higher external ambient pressure of the atmosphere causes the wrapper to be pressed closely once more into surface contact against the product mass therewithin. The behavior or reaction of the foil wrapping to the cooling constitutes at the same time an accurate test as to whether the foil wrapping has remained absolutely air-tight during the sterilization. The temperature of the cooling chamber should be lower than the cooling temperature as to be obtained within the cooled bread. The temperature of the cooling chamber therefore in general would be lower than 0° C.

Most plastic foils suitable for the packaging of food grow or expand upon heating, i.e. during the sterilization, and the growth continues even after the cooling from the sterilization temperature. This growth, therefore, may be taken into consideration when determining the area size of the wrapping foil as compared to the outer surface area of the baked bread mass being wrapped.

On the other hand, certain heat-shrinkage foils are known which have been used in the past for packaging various foods. While the phenomenon of shrinking a foil may be desirable where a tight-packaging is to be produced, the after-treatment packaging process of the present invention does not contemplate the use of such heat-shrinkable foils. The use of heat in processes contemplating heat-shrinkable foils is merely for the purpose of shrinking such foils and not for sterilization purposes.

This is especially evident from the short period of heating used for such shrinking. This would be insufficient for sterilizing any foodstuffs, and especially baked bread, which must be heated for at least an hour at higher temperatures after the sealing of the foil has taken place. While the use of heat-shrinkable foils lead to the deformation of the original disposition of the packaged goods, the usual flexible, heat-sealable polyolefin foil contemplated by the present invention, expands or grows somewhat during the sterilization, so that upon subsequent cooling, sufficient loose contact between the foil and the baked mass is attained which permits the desired visual inspection of the product within the foil.

Due to the nature of the sterilization step, it will be appreciated that the same may be carried out under atmospheric conditions and need not be performed in an autoclave under high pressure. While autoclave sterilization has been necessary for certain packaged foods, especially where an ambient pressure is required to prevent the bursting of the sealed foil packages, by reason of the inherent properties of bread, no excessive pressures are built up during the sterilization which would require a counter-pressure to prevent bursting of the foil. A much simpler and more economical procedure is, therefore, possible using an open water bath or a steam-air bath at ambient pressure.

Hence, for obtaining the packaged baked bread in accordance with the invention, it is important that the foil used, on the one hand, be sufficiently resistant to the individual operations, showing adequate mechanical and thermal stability, and, on the other hand, exhibit during prolonged storage an absolutely safe seal against the penetration of germs and spores, of mold, bacteria, and other harmful micro-organisms, while, at the same time, being free from additives, such as softeners and plasticizers which give off taste-disturbing or otherwise detrimental substances to the packaged product. It is for this reason that, in accordance with the preferred process of the invention, only softener-free or softener-poor polyolefin foils are concerned, such as polyethylene or polypropylene foils which are non-heat-shrinkable, and by reason of the critical thickness of 0.03 to 0.1 mm. are oxygen-permeable, yet simultaneously impermeable to entry of micro-organisms, bacteria, etc. therethrough. Where a polyolefin foil of the foregoing type is used, which is essentially free of plasticizers or softeners, the foil has the propensity to breathe oxygen therethrough for maintaining the freshness and durability of the baked goods, the thickness of the foil suitably being between about 0.03 and 0.08 mm. Polyethylene foil of 75 micron thickness (0.075 mm.) sold by the firm of Kalle & Co. under the name "Suprathen N-75," has demonstrated itself to be particularly suitable for this purpose as well.

It will be appreciated by the artisan that the type of foil somewhat influences the extent of time necessary for the sterilization step. Where the foil used is more temperature-resistant, e.g. at least about or above about 120 degrees C., higher sterilization temperatures, e.g. up to 120 degrees C., and shorter sterilization times will naturally be used.

In accordance with the invention, therefore, a solid, ready-to-eat amylopectin-containing food packaged in foil, evacuated and heat sterilized, is provided wherein the steps used avoid the destruction of the packaging container or foil even during the sterilization, such sterilization being effected in a simple manner without the requirement for irradiation or autoclave pressures as have been used in the past. No cooking of the bread is contemplated in accordance with the present invention, since such bread is baked bread, i.e. per se already cooked goods, which is treated immediately upon removal from the baking oven. Unlike naturally obtainable foods, such as meats, fruits, and vegetables, bread is a synthesized product not used nor prepared in integral form as grown, and therefore having critical characteristics not found in foods which are processed for packaging essentially in the form in which they are grown. Baked bread must have a critical moisture content and inherent microorganisms present therein must be neutralized or destroyed to prevent the deterioration of the goods upon prolonged storage. The ideal sterilization techniques used in accordance with the features of the present invention permit the microorganisms and bacteria present in the baked bread to be destroyed without adversely affecting the texture, flavor, appearance, freshness, etc. of the product, in spite of the critical nature of these characteristics. Since bread becomes stale after a comparatively short period of time and since cracks appearing in the bread detract from its texture and salable appearance, the criticality of the properties of this synthesized product may be readily appreciated.

Hence, the sequence of steps used to prepare the packaged baked bread in accordance with the present invention achieves the desired goal, so as to prevent mold, mildew, etc. for prolonged storage, even in excess of 9 months, without drying out the baked bread or rendering the same old-tasting, etc. upon such storage. Considering the critical moisture content necessary for preserving the texture, flavor, freshness, appearance, etc., and the ease with which these qualities are destroyed, it is surprising that the present invention achieves the desired end of destroying during the sterilization even the particularly highly resistant bacterial strains normally contained in bread without impairment of the desired qualities of the product. Since no excessive moisture is present within the sealed foil package, the foil interior is not adversely affected during sterilization which might otherwise lead to the rupture of such foil or the development of leaks by generation of excessive internal pressure during the heating.

The baked bread disposed in the foil in sterilized form and under vacuum, as prepared in accordance with the present invention, permits not only visual inspection of the mass within the foil package, even after prolonged storage so as to recognize possible appearance of putrefaction phenomena within the package, but also the convenient storage within a volume defined by the baked goods themselves even up to 9 months and longer, the bread being still fresh and palatable after this period of time. By reason of the fact that the baked bread is packaged under vacuum, one can readily ascertain whether or not the package contains any leakage, since if leakage occurs, the foil will cease to abut tightly against the bread and will not return to its original position in close contact with the ingredients therewithin when manually pulled away from the same. Most effective results are achieved in accordance with the present invention where rye-coarse meal bread, pumpernickel, rye bread, or mixed flour breads are concerned.

The following examples are given by way of illustration and not limitation:

EXAMPLE 1

(a) *For the baking of pumpernickel bread.*—Upon mixing 500 gm. coarse rye flour of the type 1800 (i.e. where 1.8 kg. ash (combustion residue) are contained in each 100 kg. of coarse flour), 5 to 30% amylopectin based upon the flour content, 300 gm. water, 1% yeast, and 1.5% salt, 500 gm. of the dough obtained after kneading are pretreated for 8 hours in hot water, the temperature of the water being more than about 60° C.

Then, the ingredients are placed in a container and inserted into a steam chamber oven for baking. The baking takes place over a period of 18 hours at 100° C. and then the bread is removed from the oven. The baked bread mass has increased in size about 10% as compared with the size of the prebaked mass, and in the 110% baked form has the approximate dimensions 120 x 100 x 70 mm.

It will be noted that the baking period and the baking temperature of this example are illustrative only, but not limitative. These conditions may be varied, as for example, the baking treatment may be performed in ovens of other types, such as gas heated ovens, or using other types of flour or other ingredients. This will be the case if it is desired to prepare rye-wholemeal bread instead of pumpernickel.

(b) *For the aging and moistening pre-treatment of fresh-baked pumpernickel.*—Pumpernickel bread having a size of 120 x 100 x 70 mm. as taken from the baking oven is immediately cooled from the baking temperature of about 100° C. to room temperature for 6 hours and allowed to age, and at the expiration of this time the bread is wrapped with a moist cloth which remains on the bread for 1 hour, so that the bread takes up 0.5 to 1% moisture (reckoned on the moisture content of the whole bread) on its surface. After the aging, the bread is stable and solid to touch with a relatively firm crust containing hard projections, whereas the bread as taken from the oven is soft and pliable. Upon treatment with the moist cloth, the bread is still firm and resilient yet the crust is no longer crispy and the hard projections have been rendered soft and innocuous.

The so-treated bread is then sliced and subjected to the following treatment for sealing and sterilizing the same in a polyethylene bag.

(c) *For the packing and sealing of fresh-cut pumpernickel.*—The individual slices of pumpernickel which are of equal size are piled so as to form a stack of a size of about 120 x 100 x 70 mm. This corresponds approximately to a weight of 500 grams, i.e. to a weight which is customary for sale. This pile is then placed in a bag consisting of a transparent polyethylene sheet of a thickness of 0.04 mm. which is free from softeners and plasticizers and resistant to heat deformation at temperatures up to about 110° C.

The polyethylene bag may be made for instance from a seamless tube of a circumference of 350 mm. and a length of 230 mm. by heat sealing at about 120° C. one end with a seam 3–5 mm. thick spaced 10 mm. from the edge.

The other open end of the bag is then clamped on the nozzle of a vacuum pump and evacuated down to 0.5 atmosphere absolute. After this degree of vacuum is reached, this end of the bag is pressed together in a vacuum-tight manner at the portion between the nozzle and the stack of bread, and then hermetically sealed closed at 120° C. in a seam of a width of 3 to 5 mm. parallel to its opening. Thereupon the bag can be removed from the nozzle of the vacuum pump and the protruding bag end possibly cut off to a length of about 15 mm. from the edge of the seam. The pile of bread is then recovered enclosed in a vacuum-tight and moisture-tight manner in a wrapping of an inside length of about 120 mm., an inside width of 100 mm. and an inside height of about 70 mm. Due to the vacuum, the wrapping rests closely, under the external pressure, around the bread bag, in which connection all details of the bread can be observed readily through the transparent wrapping.

(d) *For the sterilizing of the packaged bread.*—In this sealed condition, the bag is placed upon an enameled plate with the cut surfaces of the bread parallel to the plate and immersed in a water bath of a temperature of about 90° C. for 1½ to 3 hours, depending on the degree of sterilization desired. During this treatment the bag expands somewhat.

(e) *For optional rapid cooling of the sterilized bread.*—Immediately after the sterilization, the plate support bearing the packed pumpernickel is set in a refrigerator maintained at 10° C. and rapidly cooled, from the sterilization temperature to 10° C. within about ½ hour after being placed in such refrigerator. Each bread bag is then removed from the refrigerator and allowed to return to room temperature.

Thereupon a plurality of pumpernickel bags is finally packed in large cartons in the customary manner as is usual in the trade. The bread may be preserved this way at room temperature for 9 to 12 months, and even longer without impairment of the desired properties of the bread, e.g. freshness, texture, appearance, flavor, etc. In this regard, during the immersing in the water bath, it can already be noted whether the sealed seams are satisfactory. If not, air will escape from the wrapping. After sterilization, the residual air still enclosed in the bag cools down during the rapid cooling step so that the wrapping rests closely against the bread bag, i.e. even after the bread returns to room temperature.

EXAMPLE 2

Example 1 is repeated with an aging time of 10 hours; using the alternate moistening step of steam treatment of the bread in a closed vessel additionally containing water vapor for a period of 1 to 2 hours to increase the surface moisture of the bread by about 4 to 5%; and without slicing, placing the bread in the polyethylene bag, in this case having a thickness of 0.075 mm., squeezing the bread to about ½ the original volume and hermetically heat sealing the opening in the bag close to the adjacent side of the bread; thereby forming a vacuum of 0.5 atmosphere absolute in the bag; sterilizing the sealed bread on an aluminum plate in a closed vessel at about 90° C., using hot air completely saturated with steam, for a period of about 2½ hours; and finally rapidly cooling the hot sterilized bread in a refrigerator maintained at 0° C. within ½ hour to 0° C. The so-packaged bread is then recovered and allowed to return to normal room temperature. The amylopectin-containing bread may be preserved in the same way as in Example 1 for over 9 months at room temperature without impairment of the desired properties of the bread.

EXAMPLE 3

Example 1 is repeated, but in this case the optional rapid cooling of the sterilized bread is omitted. The bread packages obtained from the sterilization step are permitted to return to room temperature, and thereafter the bread packages are ready for commercial use. The amylopectin-containing bread, obtained in this manner, may be preserved at room temperature for months, i.e. 6 to 9 months, and even longer without impairment of the desired properties of the bread, e.g. freshness, texture, appearance, flavor, etc.

EXAMPLE 4

Example 2 is repeated, but in this case the optional rapid cooling step is omitted after the sterilization step. Instead, the bread packages are recovered from the sterilization and allowed to return to room temperature. The amylopectin-containing bread packaged in the foregoing manner, may be preserved in the same way as in Example 3 at room temperature for months, i.e. 6 to 9 months, and even longer without impairment of the desired properties of the bread.

EXAMPLE 5

Upon mixing together 75 kilograms flour, 50 kilograms water, 1 kilogram yeast, and 1 kilogram salt, with additions of required or desired spice quantities, the ingredients are kneaded thoroughly into a dough, and into the resulting dough 5–30% amylopectin based upon the flour quantity used, are thoroughly kneaded. The amylopectin quantity, if desired, may be appropriately admixed with the dry dough constituents, i.e. flour, salt, and any additional spices, and thereafter the remaining ingredients may be added and the dough kneaded. The resulting dough is molded in baking forms and the bread baked in the customary manner in accordance with the procedure of each of Examples 1, 2, 3, and 4. In each case a packaged amylopectin-containing bread is obtained which may be preserved at room temperature for at least 6 months, and even longer without impairment of the desired properties of the bread.

EXAMPLE 6

Example 5 is repeated using an amylopectin quantity of 5-10%, based on the amount of flour present, and using the procedures of Examples 1, 2, 3, and 4, in each case similar results are obtained.

EXAMPLE 7

The procedure of Example 6 is repeated, but in this case, the bread obtained after baking is not subjected to the after-treatment steps used in connection with the hermetic sealing of the bread in packages. Instead, the bread is merely packaged in the usual manner whereby the amylopectin-containing bread remains fresh for about 3-4 times the period at which bread baked in the normal manner and not containing any amylopectin remains fresh. In the case of bread made from rye flour, the period of freshness is extended from the usual 4 days of freshness to 12 to 16 days of freshness using amylopectin-containing bread. With pure wheat bread, the period of freshness is extended from the usual 2 days to from 7 to 9 days using amylopectin. Bread made with coarse meal or flour which usually remains fresh for about 10 days without special precautions, may be preserved from 30 to 40 days where the bread contains amylopectin in accordance with the invention. The foregoing periods of freshness are attained with the bread at room temperature and merely packaged in the normal way, i.e. without the after-treatment steps for the hermetic sealing and sterilizing, and/or rapid cooling procedures being used.

Although the present invention has been described in detail with respect to certain specific embodiments, various changes and modifications will become apparent to the artisan which fall within the spirit of the invention and the scope of the appended claims.

I claim:

1. In the process for baking bread in which the flour dough ingredients are mixed and then baked, the improvement for the increased preservation of the freshness thereof which comprises adding amylopectin to the flour dough ingredients to be baked, prior to baking, in an amount between about 5 and 30% by weight of the flour content of the dough.

2. Improvement according to claim 1 wherein said amount is between about 5 and 10%, and the flour dough ingredients are white bread flour dough ingredients, the baked bread being white bread.

3. Process for the increased preservation of the freshness of bread which comprises combining amylopectin, in an amount between about 5 and 30% by weight of the flour content, with the flour dough ingredients to be baked, baking the dough ingredients, the bread upon baking being thereafter enclosed in a polyolefin bag having a sealable opening, the bag then substantially evacuated of air and the opening sealed while so evacuated, and the sealed package thereby formed heat sterilized at a temperature of at least about 70° C. for at least 15 minutes.

4. Process according to claim 3 wherein the sterilization is carried out between about 70 and 100° C. for a period between about 15 minutes and 1 hour in a polyethylene bag.

5. Process for the preservation of bread which comprises combining amylopectin, in an amount between about 5 and 30% by weight of the flour content, with the flour dough ingredients to be baked, baking the dough ingredients, aging the baked bread by allowing the mass to stand for a period of at least 6 hours immediately after baking to cool and structurally stabilize the hot soft bread mass, moistening with water just the surface of the bread mass to soften slightly the outermost crispy surface portion thereof without softening the interior portion of such bread mass, hermetically sealing the bread mass in a flexible, heat-sealable polyolefin bag under a vacuum of at least about 0.8 atmosphere absolute, and thereafter sterilizing the bread mass hermetically sealed in the bag at a temperature between about 70 and 120° C. for a period of about 0.25-3 hours.

6. Process according to claim 5 wherein said amylopectin is added in an amount between about 5 and 10%.

7. Process according to claim 5 wherein said baked bread mass is sliced prior to being sealed in the bag and the expanded volume of the sealed bag containing the bread is between about 25 and 50% greater than that of the bread.

8. Process according to claim 5 wherein the baking is effected at a temperature of about 100° C. for about 18 hours, the aging is effected for a period between about 6 and 20 hours, the moistening is effected for a period between about 1 and 3 hours to take up between about 0.5 and 5% moisture, based on the moisture content of the whole bread, in the bread surface, the hermetic sealing is effected under a vacuum between about 0.3 and 0.8 atmosphere absolute in a transparent, flexible bag made of a thermoplastic material selected from the group consisting of polyethylene and polypropylene and essentially free from softeners and plasticizers and having a thickness between about 0.03 and 0.1 mm. and having a volume of about 125 to 150% of the volume of the baked goods mass, and the sterilizing is effected at about 90 to 100° C. to achieve a sterilizing temperature of between about 77 and 87° C. in the interior of the bread mass.

9. Process according to claim 8 wherein the bag is a polyethylene bag having a thickness of about 0.075 mm. slightly permeable to oxygen and resistant to heat deformation at temperatures at least up to about 105-110° C., the hermetic sealing being effected under vacuum from an external source by applying a vacuum to the interior of the bag being sealed, and the hermetically sealed bread mass immediately after sterilization being rapidly cooled within about ½ hour to between about 10 and 0° C.

10. Process according to claim 8 wherein the bag is a polyethylene bag having a thickness of about 0.075 mm. slightly permeable to oxygen and resistant to heat deformation at temperatures at least up to about 105-110° C., the vacuum applying being effected by compressing the bread mass to reduce its original volume within the bag prior to sealing, the sealing being carried out so that the bag is closely wrapped about the compacted bread mass on all sides, whereby upon sealing the bag and upon return of the bread mass to the original volume, said bread mass will be under a vacuum of about 0.5 atmosphere absolute within the sealed bag, and the hermetically sealed bread mass immediately after sterilization being rapidly cooled within about ½ hour to between about 10 and 0° C.

11. Process according to claim 5 wherein the moistening of the surface of the mass is effected by wrapping the mass in moist cloth for a period of about 1 hour.

12. Process according to claim 5 wherein the moistening of the surface of the mass is effected by subjecting the mass to contact with steam for a period of between about 1 to 2 hours.

13. Process according to claim 12 wherein the contact with steam is effected in a closed zone additionally containing water vapor.

14. Process according to claim 5 wherein the sterilization is effected at a temperature of about 90° C. in hot air saturated with steam.

15. Process according to claim 5 wherein the sterilization is effected at a temperature of about 90° C. in a water bath.

16. Process according to claim 5 wherein the sterilization is effected with the mass situated on a surface having a low coefficient of heat conduction.

17. Process for the preservation of bread which comprises combining amylopectin, in an amount between about 5 and 30% by weight of the flour content, with the flour dough ingredients to be baked, baking the dough ingredients, aging the baked bread by allowing the mass to stand for a period of from 6 to 20 hours immediately after baking to cool and solidify the hot soft mass, moistening the surface of the mass by wrapping the mass in a moist wrapping for a period of about 1 hour to take up about 0.5 to 1% moisture, based on the moisture content of the whole bread, in the bread surface and thus to soften slightly the outer crispy crust of the bread mass without softening the interior of the mass, removing the wrapping and hermetically sealing the mass in a flexible, heat-sealable foil made of a thermoplastic material selected from the group consisting of polyethylene and polypropylene, essentially free from plasticizers and having an inside volume between about 25 and 50% greater than the volume of the bread mass, under a vacuum of between about 0.3 and 0.8 atmosphere absolute so that the foil is maintained in surface contact with the bread mass, and thereafter sterilizing the mass hermetically sealed in the foil at a temperature between about 90 and 110° C. for a period of about 0.5 to 2.5 hours sufficient to effect sterilization of the bread.

18. Process according to claim 17 wherein said bread is sliced prior to sealing in the foil, said foil being a transparent, flexible polyethylene foil having a thickness between about 0.03 and 0.05 mm., and said sterilizing is effected at a temperature of about 90° C. in hot air saturated with steam with the bread mass situated discretely on a surface of aluminum having a low coefficient of heat radiation, such that the cut surfaces of the slices are maintained in a substantially horizontal plane, the resulting sterilized, hermetically sealed, hot, foil-packaged bread mass being immediately thereafter rapidly cooled within about ½ hour to a temperature between about 10 and 0° C.

19. Process according to claim 17 wherein said bread is sliced prior to sealing in the foil, said foil being a transparent, flexible polyethylene foil having a thickness between about 0.03 and 0.08 mm., and said sterilization is effected at a temperature of about 90° C. with the sealed bread mass immersed in a water bath and situated discretely on a surface of ceramic material having a low coefficient of heat conduction, such that the cut surfaces of the slices are maintained in a substantially horizontal plane, the resulting sterilized, hermetically sealed, hot, foil-packaged bread mass being immediately thereafter rapidly cooled within about ½ hour to a temperature between about 10 and 0° C.

20. Process for the preservation of bread which comprises combining amylopectin, in an amount between about 5 and 30% by weight of the flour content, with the flour dough ingredients to be baked, baking the dough ingredients, aging the baked bread by allowing the mass to stand for a period of from 6 to 20 hours immediately after baking to cool and solidify the hot soft mass, moistening the surface of the mass by subjecting the mass to contact with steam in a closed zone additionally containing water vapor for a period of between about 1 to 2 hours to soften slightly the outer crust of the bread mass without softening the interior of the mass, and hermetically sealing the mass in a flexible, heat-sealable foil made of a thermoplastic material selected from the group consisting of polyethylene and polypropylene, essentially free from plasticizers and having an inside volume between about 25 and 50% greater than the volume of the bread mass, under a vacuum of about 0.3 and 0.8 atmosphere absolute so that the foil is maintained in surface contact with the bread mass, and thereafter sterilizing the mass hermetically sealed in the foil at a temperature between about 90 and 110° C. for a period of about 0.5 to 2.5 hours sufficient to effect sterilization of the bread.

21. Process according to claim 20 wherein said bread is sliced prior to sealing in the foil, said foil being a transparent, flexible polyethylene foil having a thickness between about 0.03 and 0.08 mm., and said sterilizing is effected at a temperature of about 90° C. in hot air saturated with steam with the bread mass situated discretely on a surface of aluminum having a low coefficient of heat radiation, such that the cut surfaces of the slices are maintained in a substantially horizontal plane, the resulting sterilized, hermetically sealed, hot, foil-packaged bread mass being immediately thereafter rapidly cooled within about ½ hour to a temperature between about 10 and 0° C.

22. Process according to claim 20 wherein said bread is sliced prior to sealing in the foil, said foil being a transparent, flexible polyethylene foil having a thickness between about 0.03 and 0.08 mm., and said sterilization is effected at a temperature of about 90° C. with the sealed bread mass immersed in a water bath and situated discretely on a surface of ceramic material having a low coefficient of heat conduction, such that the cut surfaces of the slices are maintained in a substantially horizontal plane, the resulting sterilized, hermetically sealed, hot foil-packaged bread mass being immediately thereafter rapidly cooled within about ½ hour to a temperature between about 10 and 0° C.

References Cited by the Examiner

UNITED STATES PATENTS 2,989,399   6/61   Ehle ------------------ 99—90

FOREIGN PATENTS 16,362    1890   Great Britain.
345,885   4/31   Great Britain.
195,739   2/58   Austria.

A. LOUIS MONACELL, *Primary Examiner.*